United States Patent [19]
Kiyonaga et al.

[11] Patent Number: 5,371,745
[45] Date of Patent: Dec. 6, 1994

[54] ERROR CORRECTION APPARATUS FOR REPRODUCING DATA MULTI-ENCODED WITH ERROR CORRECTING CODE

[75] Inventors: Chitoku Kiyonaga; Kengo Sudoh, both of Higashihiroshima, Japan

[73] Assignee: Sharp Kabushiki Kaisha, Osaka, Japan

[21] Appl. No.: 525,092

[22] Filed: May 17, 1990

[30] Foreign Application Priority Data

May 19, 1989 [JP] Japan .................................. 1-127444

[51] Int. Cl.$^5$ ..................... G06F 11/10; G11C 29/00
[52] U.S. Cl. ..................................... 371/13; 371/40.1; 371/41
[58] Field of Search ................ 371/13, 37.4, 40.1, 371/40.2, 41

[56] References Cited

U.S. PATENT DOCUMENTS

| | | | |
|---|---|---|---|
| 3,078,443 | 2/1963 | Rose | 371/41 |
| 4,059,748 | 11/1977 | Violino | 371/13 |
| 4,549,295 | 10/1985 | Purvis | 371/13 |
| 4,750,178 | 6/1988 | Sako et al. | 371/40.1 |
| 4,817,095 | 3/1989 | Smelser et al. | 371/40.1 |
| 5,068,858 | 11/1991 | Blaum et al. | 371/41 |

FOREIGN PATENT DOCUMENTS

3910859 7/1988 Germany.
64-4981 10/1987 Japan.

OTHER PUBLICATIONS

English language abstract of Reference AA, Japanese Laying Open No. 64-4981 filed with the Oct. 31, 1990 Information Disclosure Statement.

*Primary Examiner*—Charles E. Atkinson
*Attorney, Agent, or Firm*—David G. Conlin; David S. Resnick; Peter F. Corless

[57] ABSTRACT

An error correction apparatus for reproducing data that have been multi-encoded with error correcting codes and recorded on a recording medium, and for correcting errors contained in the reproduced data through decoding the same. The apparatus includes: a reproducing circuit for reproducing the data encoded and recorded on the recording medium; a memory for storing the reproduced data; an error correction circuit adapted to correct errors of the data with the error correcting codes from the lowest to the highest levels in due order, for detecting that correction is impossible at the highest level and at an intermediate level between the lowest and the highest levels and for outputting a first and a second correction incapability detecting signals, respectively; and a controller responsive to the first and second correction incapability detecting signals for controlling the reproduction circuit, the memory and the error correction circuit. The controller controls the respective circuits to repeat error correction processing for the same data either until the errors are eliminated or until the retry number exceeds a certain limit number. Thereafter, the controller repeats the error correction processing up to the highest level either until the total retry number reaches a predetermined upper limit or until the errors are completely eliminated.

10 Claims, 6 Drawing Sheets

ERROR CORRECTION APPARATUS FOR REPRODUCING DATA MULTI-ENCODED WITH ERROR CORRECTING CODE

BACKGROUND OF THE INVENTION

1. Field of the Invention

The present invention generally relates to an error detecting and correcting system, and more particularly to an error correction apparatus which detects and corrects read errors while reproducing digital data that have been encoded with Error Correcting Codes (ECC) and recorded on a magnetic tape using a rotary head.

2. Description of the Related Art

The so-called data recorders which record digital data on magnetic tapes have been used as external memories for computers. A data recorder scans a magnetic tape with a magnetic head provided on a rotary drum to record and reproduce data on and from the tape. A defective tape, a magnetic head clogged with dirt or dust, and the like may, however, prevent correct data reproduction by the magnetic head. This phenomenon is termed "drop-out". Reproduced signals may be transformed to indicate different values due to noise. In data reproduction, therefore, there is a constant risk that data may not be correct.

In order to prevent the production of such incorrect data, a method of encoding data to be recorded with ECC is employed. In the encoding with ECC, data called parity digits are appended to the data to be processed for error correction. A data recorder executes the error detection and correction defined by ECC, based on the parity digits, to correct errors included in the reproduced data.

The number of errors correctable by ECC (error correction capability), however, is limited depending on the number of parity digits in use. When there are a number of errors, therefore, all the errors may not be completely corrected by the error correction. Such incomplete error correction can fall under two types. The first one is that although the existence of errors can be detected, the correction of the data is impossible. The second is that those data including errors are erroneously outputted as correct data.

The first type of problem can be solved as follows. When the existence of errors has been detected and yet the data are uncorrectable, the error correction apparatus performs again reproducing operation. That is, the tape is rewound by a certain amount to allow reread of the data read out just before, and decoding is repeated. This operation is referred to as "read retry". The retry may sometimes makes it possible to read data correctly, for example, relieving the head or tape of the clogging or dirt. To avoid the suspension of processing caused by retrying unlimitedly, an upper limit is generally set for the retry number. When the upper limit is exceeded, determination is made that data reading of a part concerned is impossible. As a result, at least the output of incorrect data can be prevented.

The second type of incomplete error correction is further divided into two types. Those two types involve so-called miscorrection and misdetection. The miscorrection represents a case where errors, when there are many, are erroneously located and data requiring no correction at all are corrected. The misdetection represents a case where a value of data including a number of errors happen to be altered to a different allowed value, resulting in an erroneous determination in the parity check that the data are correct. The error correction with ECC inevitably involves miscorrection and misdetection at a certain rate.

The probability of the miscorrection and misdetection, which depends on the structure of each ECC, is very small. In case of an isolated error, for example, the probability represents a value as small as once or none at all for tens or hundreds of years. The miscorrection and misdetection will offer, therefore, little problem in reproducing equipments other than the data recorders, such as an apparatus for reproducing music.

In reproducing data recorded on a magnetic tape, however, the above-described drop-out or the like may locally increase the error rate. In such a case, the probability of the miscorrection and misdetection is considerably increased. If the miscorrection and misdetection is overlooked in the data recorders, erroneous data are externally outputted as correct values. The data recorders record data of a low redundancy, unlike music or the like. If erroneous data are outputted, therefore, they may cause a significant failure in the data processing performed, for example, in a host computer coupled thereto. Consequently, the probability of the misdetection and miscorrection has to be made as small as possible in data recorders.

One method of solving the above-mentioned problem is to encode and decode data using an ECC of a high error correction capability. This ensures a substantial reduction in the probability of the miscorrection and misdetection.

However, the above-mentioned method has the following disadvantages. To enhance the error correction capability, it is required to improve the redundancy of data by increasing the number of parity digits used with the ECC. It is generally known that when the number of parity digits is increased, hardware for data encoding and decoding gets rapidly complicated. In this method, therefore, the economical requirements for obtaining highly reliable data with a lower cost can not be met.

Another method is to perform multi-encoding and multi-decoding with a plurality of ECC systems independent of each other each of which does not have enough error correction capability by itself. In this method, for example, data to be recorded are divided into a plurality of units. Each unit data contains a plurality of words each comprising a plurality of bits. The words are arranged, for example, two-dimensionally, or logically to form rows and columns. The words contained in each unit are doubly encoded and decoded in both directions of the rows and the columns. As an example of such a method, "Doubly Encoded Read Solomon Code" has been widely used.

Processing with such multi-encoded ECCs can bring about the following advantages.

(1) Each ECC employs a relatively small number of parity digits. The excessive complication of the hardware for error correction, therefore, can be avoided.

(2) Each ECC has a low error correction capability. By employing a plurality of ECC systems and thus performing error correction processing along the systems different from and independent of each other, however, the entire error correction capability is sufficiently enhanced.

Referring to FIG. 1, a conventional error correction apparatus includes: a demodulation circuit 12 for demodulating data that have been multi-encoded with error correcting codes and modulated and recorded on tracks T1 and T2 of a magnetic tape 10; a buffer memory 14 for storing output of the demodulation circuit 12; an error correction circuit 62 for multi-decoding with the ECCs the data stored in the buffer memory 14, and for, at the end of the multi-decoding, outputting an error flag signal 64 indicative of whether correction has been possible or not; and a controller 20a for receiving output of the error correction circuit 62, for determining whether retry is necessary or not, and for controlling the demodulation circuit 12, the buffer memory 14 and the error correction circuit 62 to repeat the processings if retry is necessary and to proceed to subsequent data processings if not necessary.

The signals recorded on the magnetic tape are divided into a plurality of frames each including the two tracks T1 and T2. The demodulation circuit 12 reads data of one frame and outpours the read-out data to the buffer memory 14.

The controller 20a includes a retry counter 58 for counting the number of retries made for one error correction processing, a memory 60 for storing an upper limit of the retry number in advance, and a retry determining circuit 66 for determining as to whether retry should be made or not according to values of the error flag 64, the retry counter 58 and the memory 60.

The error correction apparatus further includes an interface 16 connected to output of the buffer memory 14 for outputting contents stored in the buffer memory 14, for example, to a host computer.

The controller 20a includes, for example, a microcomputer and the like. FIG. 2 is a schematic flow chart of a program executed in the controller 20a for retry control.

Referring to FIGS. 1 and 2, a conventional error correction apparatus operates as follows. The tape 10 is driven by a capstan motor, a capstan, a pinch roller and the like, which are not shown, and guided by an unshown tape guide or the like to run in a predetermined direction.

The demodulation circuit 12 reads data recorded on the tracts T1 and T2 using an unshown rotary head, performs required processings such as equalization and demodulation, and applies the processed data to the buffer memory 14.

The buffer memory 14 stores one-frame data received from the demodulation circuit 12 (step S101).

The error correction circuit 62 initially makes the retry counter 58 represent zero by its content A (step S102). The circuit 62 decodes with the ECCs data stored in the memory cell 14 sequentially from the lowest level, and corrects errors if any contained therein (step S103). When the error correction processing for the lowest level is completed, another error correction processing is performed for the subsequent level. Even if an uncorrectable error has been detected at a lower level, the error may disappear in another error correction processing for a higher level. When the error correction processing is completed up to the highest level, the error correction circuit 62 makes determination whether or not an uncorrectable error has been detected or not (step S104).

If such an error has been detected, the error correction circuit 62 makes the error flag signal 64 logical high. If such an error has not been detected, or it is determined that complete error correction has been made, the error correction circuit 62 makes the error flag signal 64 logical low.

The retry determining circuit 66 operates as follows, depending on value of the error flag signal 64. When the error flag signal 64 is logical low, the retry determining circuit 66 resets the retry counter 58. The retry determining circuit 66 controls the buffer memory 14 and the interface 16 such that contents stored in the memory 14 are transmitted through the interface 16 to a host computer (step S106). The retry determining circuit 66 further controls the demodulation circuit 12 and the memory 14 such that data recorded on the subsequent tracks T1 and T2 of the tape 10 are read out and the subsequent error correction processing begins.

When the error flag signal 64 is logical high, the retry determining circuit 66 compares the content A of the retry counter 58 with a maximum retry number L stored in the memory 60 (step S107). If the number A represented by the retry counter 58 is smaller than the maximum retry number L, the retry determining circuit 66 adds one to the value A of the retry counter 58 (step S109). The retry determining circuit 66 controls the demodulation circuit 12 and the memory 14 such that data read out just before is reread (step S110). The retry determining circuit 66 further control the error correction circuit 62 to perform error correction processing in due order from the lowest level to the highest level (step S103).

If the value A of the retry counter 58 is not smaller than the maximum retry number L, the retry determining circuit 66 externally outputs a message of "DATA-ERROR". The retry determining circuit 66 then abandons the processing (step S108). Thus, if the detection of errors does not disappear in spite of the retries of the maximum retry number, the processing is abandoned. Accordingly, erroneous data is never externally outputted.

As described above, when data is multi-encoded with ECCs, errors contained in the data can be corrected with a relatively simple hardware but with a large capability.

However, the conventional apparatus has the following problems. The conventional apparatus has high error correction capability due to the multi-encoded ECCs employed therein. It is true that the probability of miscorrection and misdetection taking place in the conventional apparatus is low, but there is no denying that it takes a certain value.

For example, when a miscorrection or the like is made in the error correction processing at a certain level, the occurrence of the miscorrection or misdetection will be usually checked in the error correction processing at a higher level. However, also the probability of miscorrection or the like taking place in the error correction processing at the higher level is not null, though it may be extremely low. Especially when a miscorrection or the like occurs in the error correction processing at a higher level, there is not left much opportunity that the occurrence of the miscorrection or the like is checked. Thus, the probability that a miscorrection or the like in a higher-level processing will be detected is low. If retry is repeated many times, therefore, the probability become relatively high that the processing will terminate without detecting a occurrence of miscorrection or the like if the miscorrection occurs, for example, at a higher level.

As described above, the probability of a miscorrection or the like taking place should be made as small as possible. Meanwhile, the error correction capability of an error correction apparatus should not be reduced while the excessive complication of hardware therefor should be avoided.

SUMMARY OF THE INVENTION

An object of the present invention, therefore, is to provide an error correction apparatus using a plurality of ECC systems which can lower the probability of a miscorrection or the like taking place without reducing error correction capability.

An error correction apparatus according to the present invention is for reproducing data that have been recorded on a recording medium after multi-encoded at a predetermined first number of levels with one or a plurality of error correcting codes, and correcting errors contained in the reproduced data through decoding. At each level, there is an upper limit for the number of errors correctable with the corresponding error correcting code. When errors occur beyond the upper limit at a certain level, the error correction processing at that level becomes impossible. The apparatus includes a reproduction circuit for reproducing the data encoded and recorded on the recording medium. The reproduced data may contain some errors. The apparatus further includes a memory for storing the reproduced data, an error correction circuit set to correct errors contained in the stored data with the ECCs from the lowest level to the level of the first number in due order, for detecting that the error correction with the error correcting codes is impossible at the level of the first number or at a level of a second number smaller than the first number, and for outputting a first and a second correction incapability detecting signals, respectively, and a control circuit responsive to the first and second correction incapability detecting signals for controlling the reproduction circuit, the memory and the memory error correction circuit.

According to a preferred embodiment of the present invention, the error correction circuit includes a first error correction operating circuit which performs an error correction processing from a level immediately after the second number level up to the first number level in due order for outputting the first correction incapability detecting signal when it is determined as a result of the error correction processing that correction is impossible.

According to a more preferred embodiment of the present invention, the error correction circuit further includes a second error correction operating circuit which performs an error correction processing from the lowest level up to the second number level in due order for outputting the second correction incapability detecting signal when it is determined as a result of the error correction processing that correction is impossible.

According to a still more preferred embodiment of the present invention, the control circuit includes a partial retry determining circuit responsive to the second correction incapability detecting signal for determining whether or not the data reproduction by the reproduction circuit, the data storage by the memory, and the error correction processing up to the second number level by the error correction circuit should be repeated.

According to a still more another preferred embodiment of the present invention, the control circuit further includes a retry determining circuit responsive to output of the partial retry determining circuit and the first correction incapability detecting signal for determining whether or not the data reproduction by the reproduction circuit, the data storage by the memory, and the error correction processing by the error correction circuit should be repeated, and for determining to what level the correction processing should be repeated.

In the error correction apparatus according to the present invention, reproduction circuit reproduces data from a the recording medium and the reproduced data are stored in the memory. The error correction circuit performs error correction processing on the stored data from the lowest level in due order. The error correction circuit outputs the second correction incapability detecting signal when error correction is impossible at the second number level. When the error correction processing up to the first number level is completed, the error correction circuit detects whether or not the error correction processing is possible at the first number level, and if impossible, outputs the first correction incapability detecting signal. The control means controls the reproduction circuit, the memory, and the error correction circuit in response to the first and second correction incapability detecting signals.

In the error correction processing performed by the error correction apparatus according to the present invention, whether or not error correction is impossible is detected not only at the first number level but at the second number level. When compared with a conventional apparatus which makes determination as to whether or not error correction is impossible only at a first number level, the probability that miscorrection or the like will be detected can be enhanced. In other words, the probability that the error correction processing will terminate without detecting miscorrection or the like is reduced when compared with the conventional case.

When an error correction apparatus includes an error correction operating circuit, as in a preferred embodiment of the present invention, the error correction processing at a higher level than a second number level can be used to check the results of the error correction processings up to the second number level. Even if miscorrection or the like has occurred in the processings up to the second number level, therefore, the probability that erroneous data will be externally outputted is reduced.

Further, when an error correction apparatus includes a second error correction operating circuit, as in another preferred embodiment of the present invention, the error correction processing can be performed from the lowest level to a second number level and from the second number level to the highest level. Thus, the error correction processing can be performed from the lowest level to the highest level without reducing the error correction capability of the apparatus according to the present invention.

Consequently, the present invention can provide an error correction apparatus using a plurality of ECC systems which can reduce the probability of miscorrection or the like taking place without reducing its correction capability.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Figure 3:
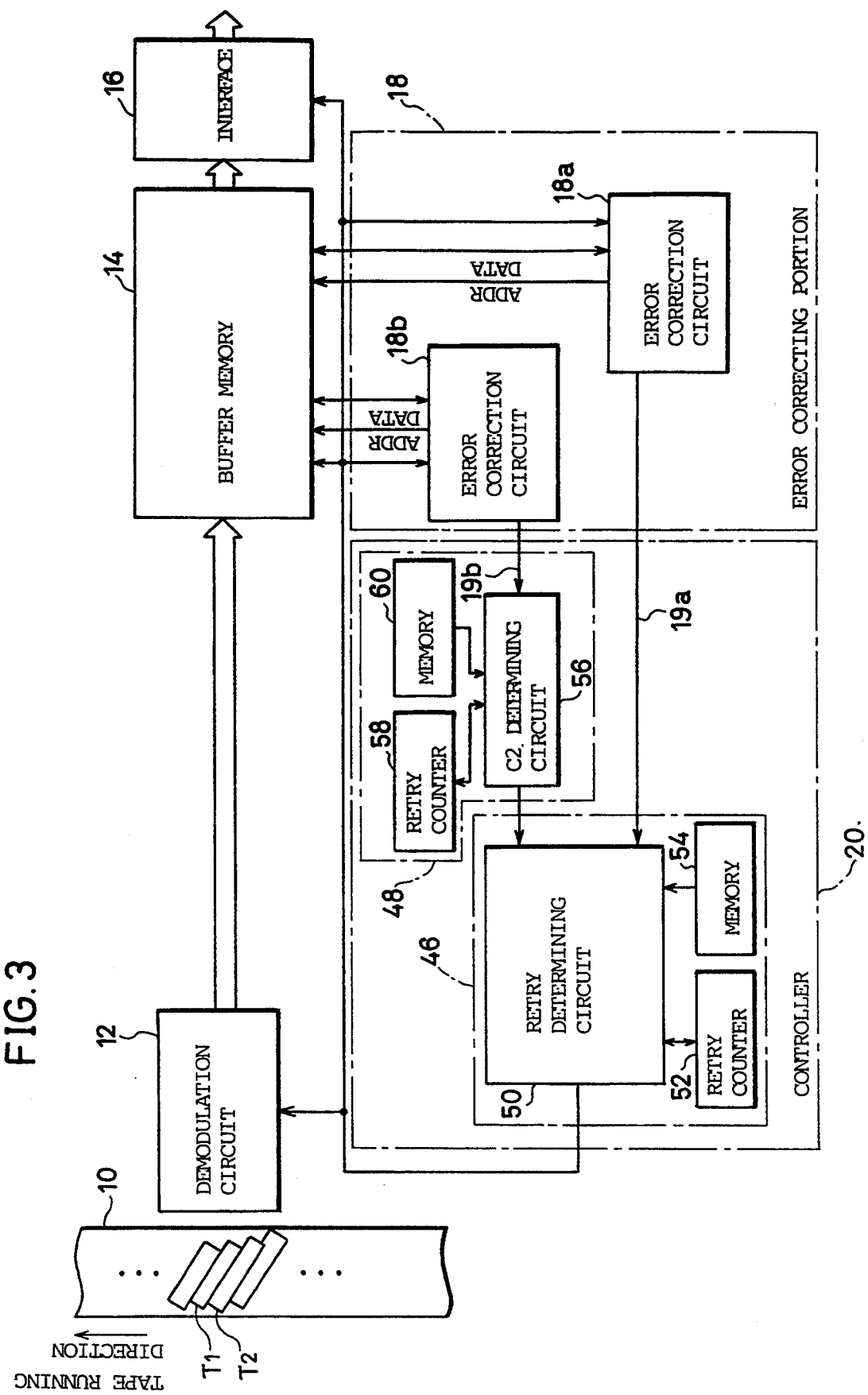
FIG. 3 is a block diagram of an error correction apparatus according to an embodiment of the present invention.
Figure 4:
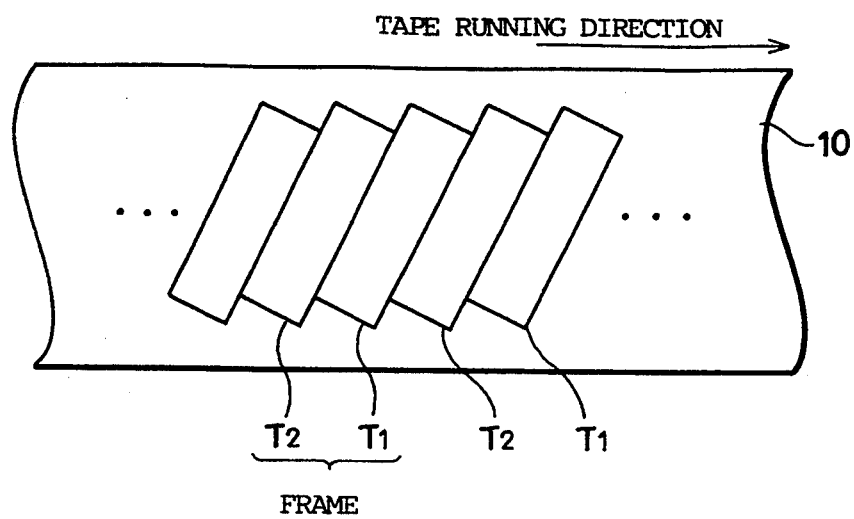
FIG. 4 is a typical diagram showing alignment of tracks on a magnetic tape.

Referring to FIG. 3, there are formed a plurality of tracks T1, T2 on a tape 10. The paired tracks T1 and T2 forms one frame of data. The tracks T1 and T2 have data recorded thereon which have been multi-encoded with error correcting codes in advance.

Referring to FIG. 3, the error correction apparatus according to the present invention includes: a demodulation circuit 12 which scans the magnetic tape 10 with an unshown magnetic head or the like, reads out the data recorded on the tracks T1 and T2, performs processings such as equalization and demodulation and outputs the processed data; a buffer memory 14 connected to the demodulation circuit 12 for storing the digital data reproduced by the demodulation circuit 12; an error correcting portion 18 connected to the buffer memory 14 for correcting, based on the stored data and parity digits appended to the data, errors contained in the stored data with a plurality of systems, for example, three systems of error correcting codes, for determining at the ends of the error correction processings with, for example, the second (C2) and third (C3) systems whether or not error correction has been impossible, and for outputting a first and a second error flag signals 19a and 19b, respectively; a controller 20 for determining, in response to the error flag signals 19a and 19b, whether the processings from reproduction to correction should be repeated for the current data or should be applied to the subsequent data, and for controlling the demodulation circuit 12, the memory 14 and error correcting portion 18 according to the determination; and an interface 16 connected to the memory 14 and the controller 20, for transmitting, under control of the controller 20, stored contents in the memory 14 to a host computer or the like when the error correction processing for the data stored in the memory 14 is completed.

Figure 1:
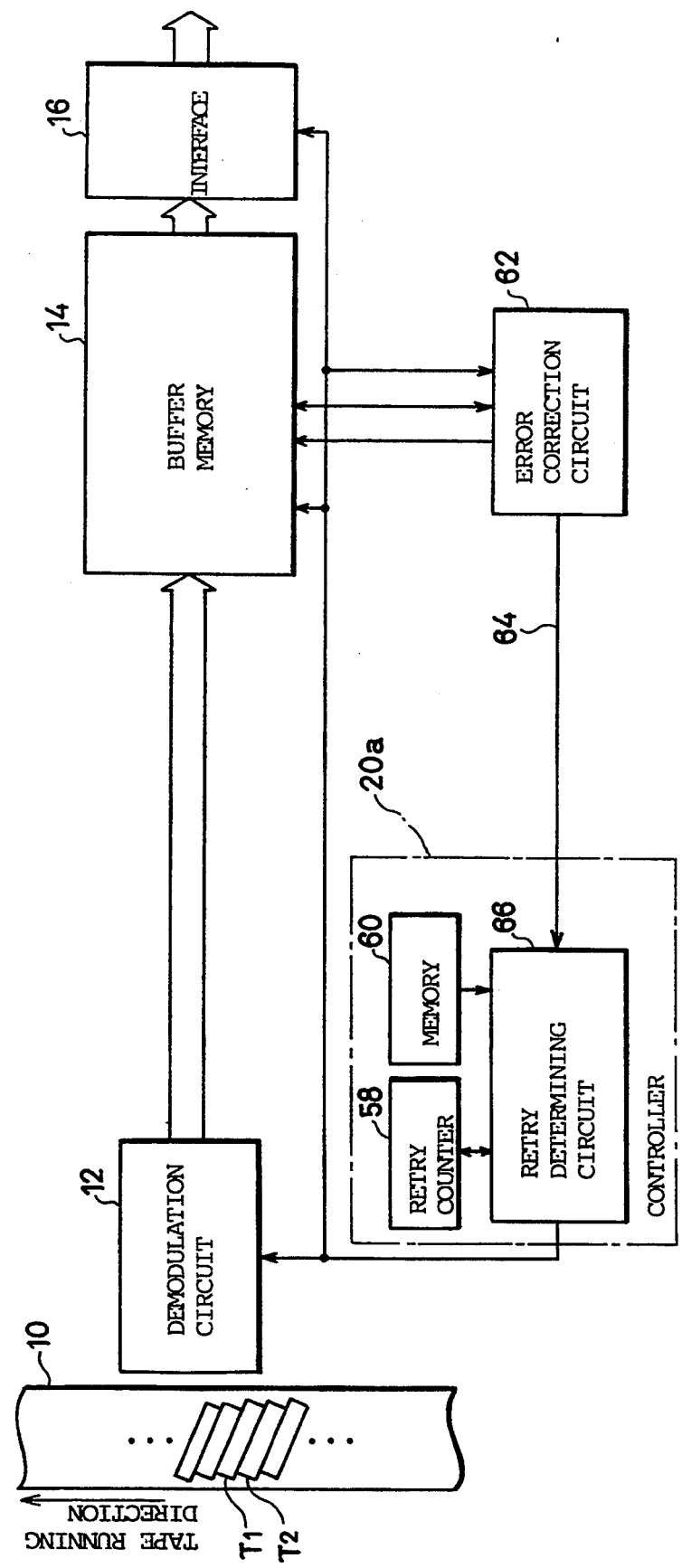
FIG. 1 is a block diagram of a conventional error correction apparatus.
Figure 2:
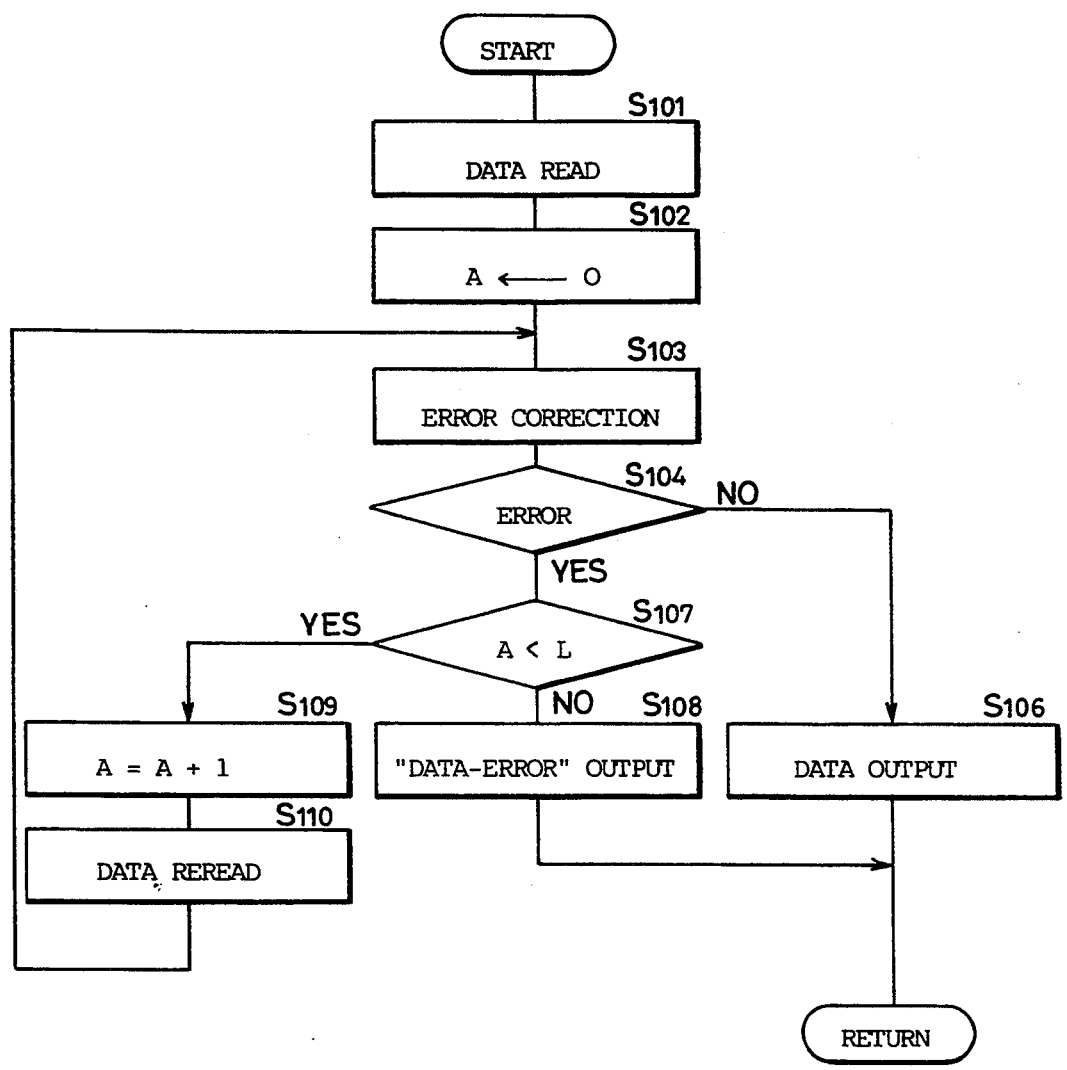
FIG. 2 is a flow chart of a program executed in a controller of a conventional error correction apparatus.

In FIG. 3, the same reference characters and designations are allotted to the same elements as those in the conventional circuit shown in FIG. 1. The same elements function in the same manner. Therefore, detailed description thereof will not be repeated here.

The error correcting portion 18 includes a first error correction circuit 18a connected to the memory 14 and the controller 20 for performing error correction processing of the third system, and for outputting the first error flag 19a in case that uncorrectable errors are found in the error correction processing of the third system, that is, at the highest level, and a second error correction circuit 18b connected to the demodulation circuit 12, the memory 14 and the controller 20 for performing error correction processings of a first and a second systems on the data stored in the memory 14, and for outputting the second error flag signal 19b in case that uncorrectable errors are found in the error correction processing of the second system.

The controller 20 includes a second-system retry control circuit 48 responsive to the second error flag 19b for determining whether or not the error correction processings of the first and second systems by the demodulation circuit 12, the memory 14 and the second error correction circuit 18b should be repeated, and a retry control circuit 46 responsive to the first error flag signal 19a and output of the second-system retry control circuit 48 for determining whether or not the error correction processing by the demodulation circuit 12, the memory 14 and the error correcting portion 18 should be repeated, and if the determination is affirmative, for determining to what level the retry should be repeated.

The second-system retry control circuit 48 includes a retry counter 58 for counting the retry up to the second system, a memory 60 for storing in advance an upper limit of the retry up to the second system, a C2 determining circuit 56 for determining, based on the second error flag signal 19b and stored contents of the retry counter 58 and the memory 60, whether or not the error correction processing up to the C2 system should be repeated.

The retry control circuit 46 includes a retry counter 52 for counting the total retry number, a memory 54 for storing in advance upper limit value of the total retry numbers up to the C2 system and the C3 system, and a retry determining circuit 50 for determining, based on output of the C2 determining circuit 56, the first error flag signal 19a, and stored contents of the retry counter 52 and the memory 54, whether or not retry should be made, and if the determination is affirmative, specifying the level up to which the error correction processing should be applied.

Figure 6:
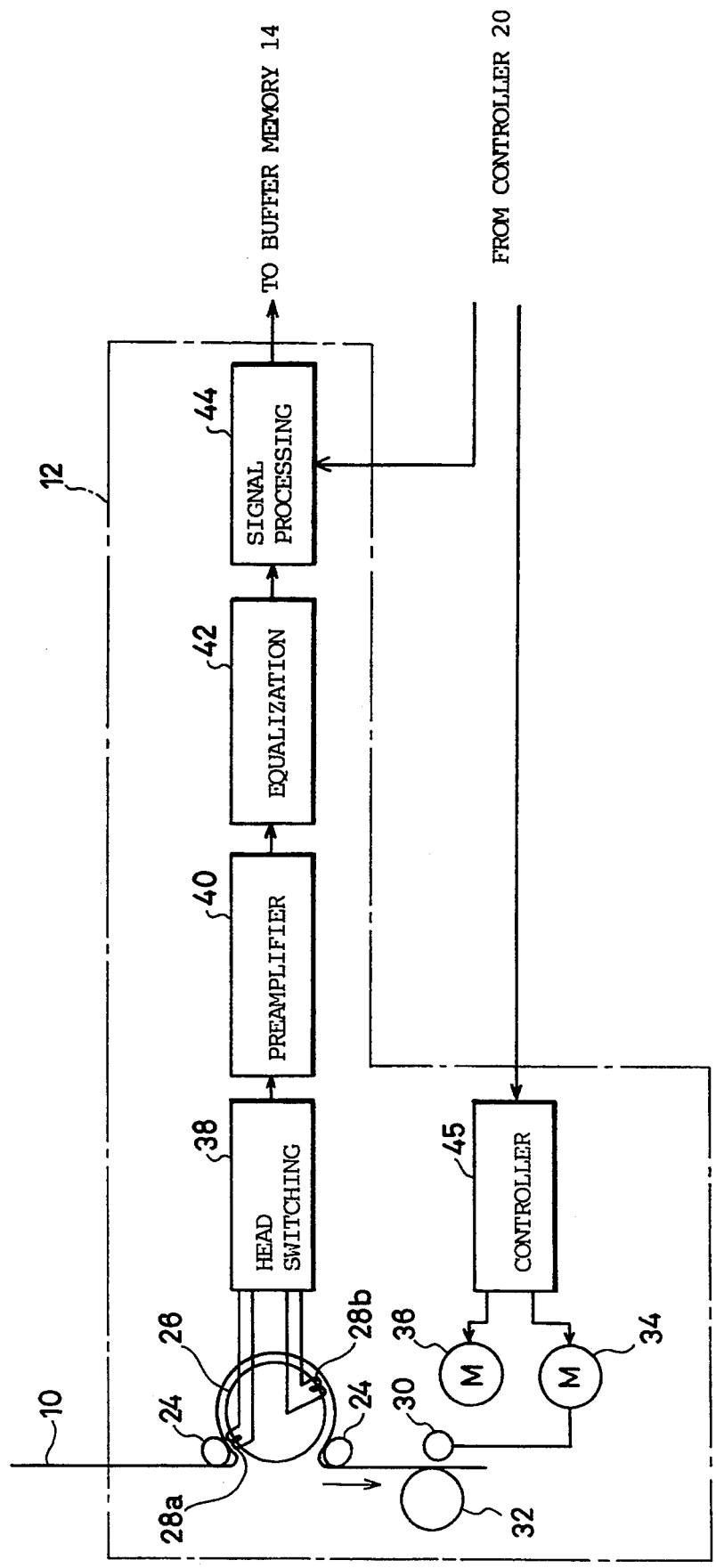
FIG. 6 is a block diagram of an error correction apparatus according to another embodiment of the present invention, in which a controller including a microcomputer is used.

Referring to FIG. 6, the reproduction circuit 12 includes a pinch roller 32, a capstan 30, and a tape guide 24 for running the tape 10 in a predetermined direction, a capstan motor 34 for driving the capstan 30, a rotary drum 26 having magnetic heads 28a and 28b provided opposite to, or 180° apart from each other for scanning the tape 10, a motor 36 for rotating the drum 26, a head switching circuit 38 for alternately selecting outputs of the heads 28a and 28b, a preamplifier circuit 40 for amplifying the outputs of the heads 28a and 28b, an equalizing circuit 42 for compensating distortion of signals outputted from the preamplifier circuit 40, a signal processing circuit 44 for demodulating reproduced signals to output digital signals, and a controller 45 for controlling the capstan motor 34, the motor 36 and the like according to instructions from the controller 20.

The error correction apparatus according to the present invention operates as follows. The tape 10 is driven by the capstan 30, the pinch roller 32 and the capstan motor 34 to run in the direction indicated by arrow. The demodulation circuit 12 reads data recorded on one pair of the tracks T1 and T2 of the tape 10 with the magnetic heads 28a and 28b to apply the read-out data to the memory 14. Data recorded on one pair of the tracks T1 and T2 form one data-unit for the error correction processing, which is referred to as one frame.

Figure 5:
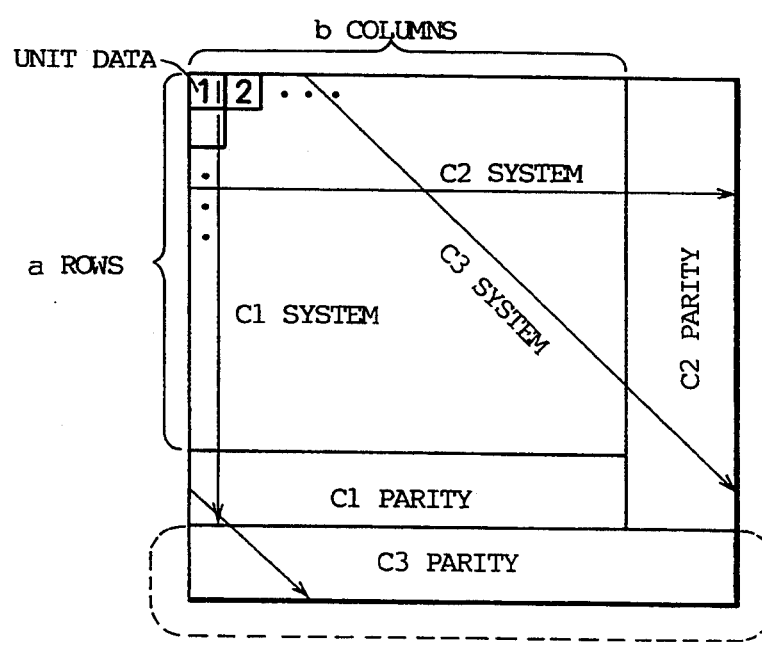
FIG. 5 is a typical diagram of a memory, showing an arrangement pattern of words and parity digits is or the like stored in the memory.

The memory 14 stores data of one frame. Referring to FIG. 5, the memory 14 stores a plurality of words contained in one data-unit such that they are logically arranged in a two dimensional matrix. Among the thus stored data, the original data to be reproduced are arranged to form a matrix of a rows by b columns for every word unit. Parities of the first system (C1 parity) are stored in several rows following the a-throw. Parities of the second system (C2 parity) are stored in the columns following the b-th column. Parities of the third system (C3 parity) are stored in a portion following the C1 parity and the C2 parity.

The controller 20 first makes the second error correction circuit 18b operate to perform error correction processings of the C1 and C2 systems.

The error correction circuit 18b first performs error correction processing in the column direction of the data stored in the memory 14. Subsequently, the error correction circuit 18b performs error correction processing in the row direction of the data stored in the memory 14. When the error correction processing of the C2 system terminates, the error correction circuit 18b checks whether uncorrectable errors have occurred or not. If any uncorrectable error has occurred, the error correction circuit 18b makes the error flag 19b logical high, and if not, makes the same logical low.

When the error flag signal 19b is logical low, the C2 determining circuit 56 makes determination that repetition of the processings up to the C2 system is unnecessary and applies a signal indicative of the determination to the retry determining circuit 50. When the error flag signal 19b is logical high, the C2 determining circuit 56 compares the value represented by the retry counter 58 with the maximum retry number which is stored in the memory 60 as an acceptable value up to the C2 system. When the value of the retry counter 58 is smaller than the upper limit of the retry number for the second system, the C2 determining circuit 56 makes determination that the error correction up to the C2 system should be retried, and applies a signal indicative of the determination to the retry determining circuit 50 while incrementing the content of the retry counter 58 by one.

When the content of the retry counter 58 is larger than or equal to the upper limit of retry for the second system, the C2 determining circuit 56 makes determination that retry up to the second system processing is unnecessary, and applies a signal indicative of the determination to the retry determining circuit 50.

The retry determining circuit 50 operates as follows when output of the C2 determining circuit 56 indicates that the error correction processing up to the second system should be repeated. That is, the retry determining circuit 50 increments the content of the retry counter 52 by one and gives the controller 45 an instruction to repeat reading of the data.

The controller 45 drives the capstan motor 34 to rewind the tape 10 by a predetermined amount.

As described above, the heads 28a and 28b scan the same tracks T1 and T2 as they have scanned just before and reread the data recorded thereon. The read-out data is stored again in the buffer memory 14 through the head switching circuit 38, the preamplifier circuit 40, the equalizing circuit 42 and the signal processing circuit 44. At this time, deposition of dusts or the like, for example, on the head 28a or a recording surface of the tape 10 may happen to be removed. Accordingly, the data stored in the memory 14 may not always be just the same as those stored last time. Thus, the number of errors contained in the data stored in the memory 14 this time may differ from that of the same data read out last time.

When the storage of data to the memory 14 is completed, the retry determining circuit 50 makes the error correction circuit 18b resume operation to perform the error correction processing up to the second system.

When output of the C2 determining circuit 56 indicates that repetition of the error correction processing up to the second system is unnecessary, the retry determining circuit 50 operates as follows. The retry determining circuit 50 controls the first error correction circuit 18a to perform error correction processing of the third system. Referring to FIG. 5, the error correction processing of the third system is performed in the direction diagonally traversing the data stored in the memory 14. In practice, operation for the error correction is made by sequentially reading respective words in the directions indicated by arrows in FIG. 5. The sequential reading of words in the directions of the arrows is effected by switching read addresses of the memory 14 such that the selected position shifts in the directions indicated by the arrows. The error correction circuits 18a and 18b are provided with address generating circuits therefor.

The error correction circuit 18a makes determination as to whether there have been uncorrectable errors or not at the time when the error correction processing up to the third system is completed. If there has been any uncorrectable error, the circuit 18a makes the error flag signal 19a logical high, and if not, makes the same logical low.

When the error flag signal 19a is logical low, the retry determining circuit 50 operates as follows. Since there is no uncorrectable error detected at the end of the processing of the third system, the retry determining circuit 50 controls the interface 16 and the memory 14 such that the stored contents of the memory 14 are transmitted to the host computer or the like. Further, the retry determining circuit 50 resets the retry counters 52 and 58 to represent 0. Thereafter, the retry determining circuit 50 controls the demodulation circuit 12, the memory 14 and the error correcting portion 18 such that data processing is performed for the subsequent frame.

When the error flag signal 19a is logical high, the retry determining circuit 50 compares value represented by the retry counter 52 with an upper limit of retry stored in the memory 54. If the value of the retry counter 52 is smaller than the upper limit, the retry determining circuit 50 controls the demodulation circuit 12 such that the tape 10 in rewound and the same portion of data as just read out is reread. The read-out data is stored in the memory 14 and undergoes error correction by the error correcting portion 18.

If the value of the retry counter 52 is larger than or equal to the upper limit of retry number, the retry determining circuit 50 externally outputs a message of "DATA-ERROR" and halts the processing. This is because uncorrectable errors have been detected at the time when the error correction processing up to the third system is completed, whereas that the predetermined number of retries have been already made.

Figure 7:
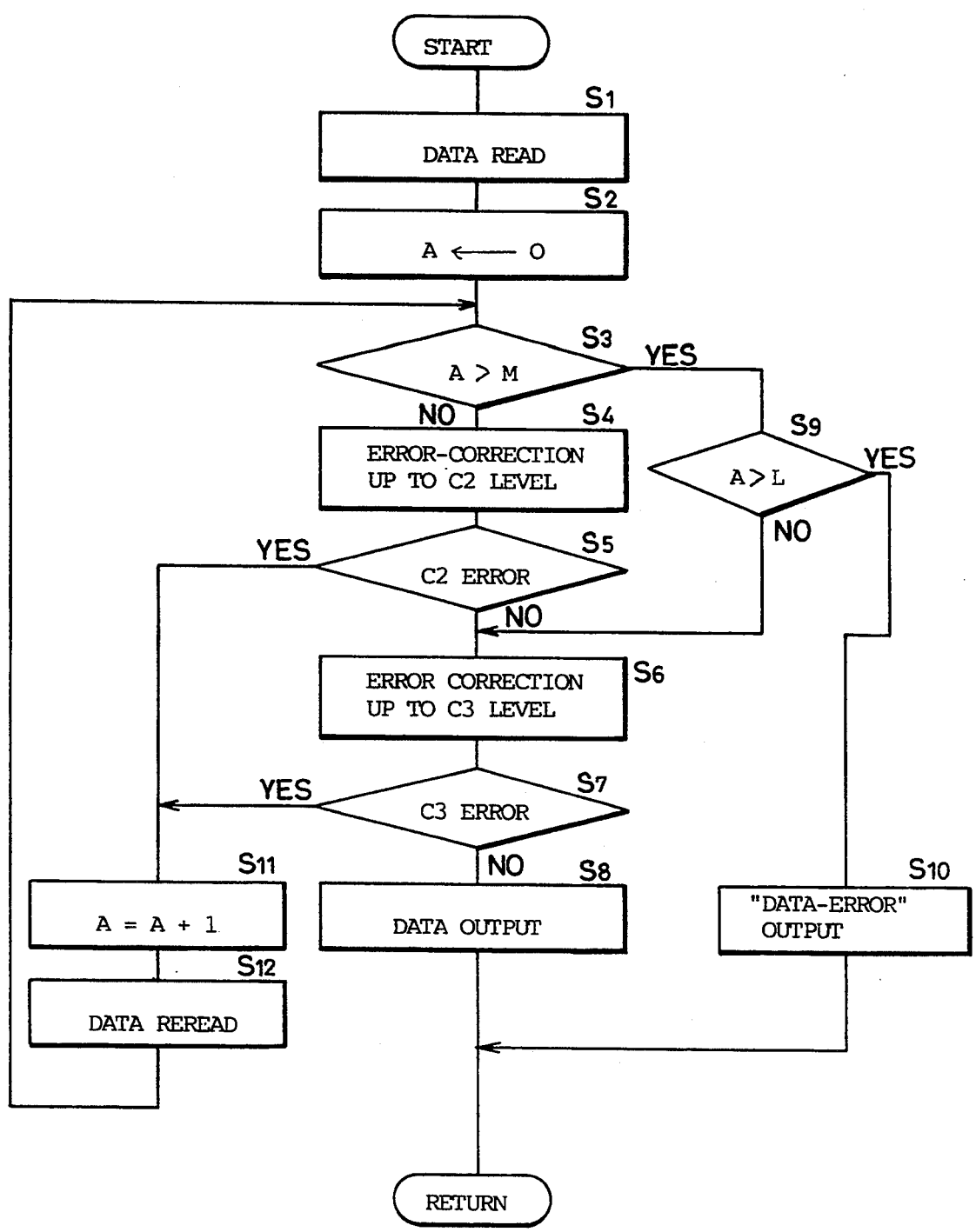
FIG. 7 is a flow chart of a program executed in the controller of the error correction apparatus shown in FIG. 6.

The controller 20 is in practice implemented as a microcomputer or the like. Referring to FIG. 7, a program executed in a microcomputer as the controller 20 will be as follows. At step S1, the demodulation circuit 12 reads out data of one frame on the tape 10, which is then stored in the memory 14.

At step 52, a working register A of the microcomputer is set to represent 0.

At step S3, it is determined whether or not value represented by the register A is larger than an upper limit M of the retry number for the processing up to the second system. If the answer is NO, the control proceeds to step S4, or otherwise, to step S9. At step S4, the error correction processing up to the second system is performed. When the processing at step S4 is completed, the control proceeds to step S5, where it is determined whether or not any uncorrectable error has been detected in the error correction processing of the second system. If the answer is YES, the control proceeds to step S11, or otherwise, to step S6.

If the determination is YES at step S3, the control proceeds to step S9, where it is determined whether or not the value of the register A is larger than an upper limit L of the total retry number. If the answer is NO, the control proceeds to step S6. Else it proceeds to step S10.

At step S6, error correction processing up to the third system is performed. In this case, if the error correction processing up to the second system has been already performed at step S4, only the error correction processing of the third system is performed. When the control has transferred to step S6 from step S9, the error correction processings from the first to third systems are sequentially performed.

When the processing at step S6 is completed, the control proceeds to step S7, where it is determined whether or not any uncorrectable error has been detected in the error correction processing of the third system. If the answer is YES, the control proceeds to step S11. Else it proceeds to step S8.

At step S8, it is determined that data is correct since no error has been eventually found in the error correction processing of the third system. The data is externally applied through the interface 16.

At step S11, the content of the register A is incremented by one.

Subsequently, at step S12, the tape 10 is rewound and rereading of the data read out just before is effected. Thereafter, the control returns to step S3.

As described above, with the error correction apparatus according to the present invention, the following advantages can be obtained.

(1) When the data initially stored in the memory 14 contains no error, the error correction processings from the first to third systems will be completed straight at a first attempt without any problem.

(2) When the data initially stored in the memory 14 contains only those errors correctable by the error correction processing up to the second system, they are corrected by the error correction processing up to the second system only. Accordingly, there will arise no problem in the error correction processing of the third system.

(3) When the data initially stored in the memory 14 contains those errors uncorrectable by the error correction processing up to the second system, the following two cases will be considered.

(a) The first case is that the uncorrectable errors are detected in the error correction processing up to the second system. In this case, if within an upper limit of the retry number for the error correction processing up to the second system, retry is made. If the uncorrectable state of the errors is eliminated as a result of the retry, the error correction processing of the third system is performed without any problem. In spite of the retry, however, the uncorrectable state of the errors may not be eliminated within the upper limit of the retry number allowed for the processing up to the second system. In some cases, erroneous determination may be made that those data, containing errors in practice, are free from errors, due to miscorrection, misdetection and the like. In this case, the processing falls under case (b) as will be described below.

(b) When miscorrection or misdetection has occurred in the error correction processing up to the second system, the following two cases will be considered.

(i) The errors may be corrected in the error correction processing of the third system. In this case, the data containing errors are corrected and outputted.

(ii) Another case is that correction may not be properly made in the error correction processing of the third system. One example of such a case is that existence of uncorrectable errors is detected in the error correction processing of the third system. In this case, retry is made within an upper limit of the retry number allowed for the processing up to the third system. As a result of the retry, the errors may be or may not be eliminated. At least in this case, however, it is recognized that miscorrection or misdetection may have taken place in the error correction processing up to the second system. Therefore, erroneous data caused by miscorrection or the like can not be outputted.

Another possibility is that miscorrection, misdetection or the like may occur in the error correction processing of the third system. Since the error correction processing is not performed for a level higher than the third system, miscorrection or misdetection at the third level directly leads to output of erroneous data. The probability of such miscorrection or the like taking place increases with the number of error correction processings carried out at the third level. In the error correction apparatus according to the present invention, the error correction processing of the third system is performed only in the latest ones of a plurality of retries. When compared with a conventional case that the error correction processing of the third system is performed for all retries within a maximum retry number, therefore, there is a less possibility that miscorrection or the like may occur in the error correction processing of the third system.

It is a matter of course that if the number of systems with which error correction processing is performed, and the error correction processing performed at each level are identical to each other, the error correction apparatus according to the present invention and a conventional one will have the same error correction capability.

As has been described in the foregoing, according to the present invention, an error correction apparatus can be provided which can reduce the probability that miscorrection, misdetection and the like will occur, without reducing the error correction capability.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. An error correction apparatus for reproducing data that have been multi-encoded at a predetermined first number of levels with one or more types of error correcting codes and recorded on a recording medium, and for correcting errors contained in said reproduced data through decoding the same, said error correcting codes being capable of, at each of said levels, correcting only a number of errors contained in said data within a predetermined upper limit, comprising:

reproducing means for reproducing said encoded data that have been recorded on said recording medium, said reproduced data possibly containing errors;

memory means for storing said reproduced data;

error correction means adapted to correct said errors of said stored data with said error correcting codes from the lowest level to the level of said first number in due order, for detecting that correction with said error correcting codes is impossible at the level of said first number and at a level of a second number smaller than said first number and for outputting a first and a second correction incapability detecting signals, respectively; and control means responsive to said first and second correction incapability detecting signals for controlling said reproduction means, said memory means and said error correction means.

2. The error correction apparatus according to claim 1, wherein said error correction means comprises a first error correction operating means for performing error correction processing from a level immediately after the level of said second number to the level of said first number and for outputting said first correction incapability detecting signal in case that correction of said stored data has proved to be impossible as a result of the error correction processing.

3. The error correction apparatus according to claim 2, wherein said error correction means further comprises a second error correction operating means for performing error correction processing from said lowest level to the level of said second number and for outputting said second correction incapability detecting signal in case that correction has proved to be impossible as a result of the error correction processing.

4. The error correction apparatus according to claim 3, wherein said control means comprises a partial retry determining means responsive to said second correction incapability detecting signal for determining whether or not the data reproduction by said reproducing means, the storage of said data by said memory means and the error correction processing up to the level of said second number by said error correction means should be retried.

5. The error correction apparatus according to claim 4, wherein said control means further comprises retry determining means responsive to output of said partial retry determining means and said first correction incapability detecting signal for determining whether or not the reproduction processing by said reproducing means, the storage of data by said memory means, and the error correction processing by said error correction means should be retried, and if the determination is affirmative, for determining up to which level the error correction processing should be applied.

6. The error correction apparatus according to claim 5, wherein said retry determining means comprises:

detecting means for detecting the number of retries which have been made depending on the determinations by said retry determining means; and retry terminating means for terminating retry irrespective of said first correction incapability detecting signal and output of said partial retry determining means when a value represented by said detecting means is larger than a predetermined value.

7. The error correction apparatus according to claim 4, wherein said retry determining means comprises means for determining whether or not said first error correction operating means should be activated in response to output of said partial retry determining means.

8. The error correction apparatus according to claim 4, wherein said partial retry determining means comprises:

partial retry detecting means for detecting the number of retries which have been made in the processings up to the level of said second number;

storage means for storing in advance an upper limit of the retry number allowed in the processings up to the level of said second number; and comparing means connected to said partial retry detecting means, said storage means and said second error correction operating means for comparing the value of said partial retry detecting means with said upper limit in response to said second correction incapability detecting signal and for outputting the comparison results to said retry determining circuit.

9. The error correction apparatus according to claim 8, wherein said retry determining means comprises:

retry detecting means for detecting the number of retries which have been made depending on the determinations by said retry determining means;

second storage means for storing a predetermined upper limit for the number of retries which can be made depending on the determinations by said retry determining means; and retry control means for controlling said reproducing means, said memory means and said error correction means on the basis of the value of said retry detecting means, the content of said second storage means, output of said first error correction operating means and output of said partial retry means.

10. A method of error correction on, comprising the steps of:

(a) reproducing data which have been multi-encoded at a predetermined first number of levels with one or more types of error correcting codes and recorded on a recording medium;

(b) performing error correction processing on said reproduced data from the lowest level to a level of a predetermined second number smaller than said first number and determining whether an uncorrectable error exists or not;
(c) repeating the processings of said steps (a) and (b) either until said uncorrectable error is eliminated or until the repetition number of said steps (a) and (b) becomes larger than a predetermined first limit number;
(d) performing error correction processing on said reproduced data from a level immediately after the level of said second number to the level of said first number and determining whether said uncorrectable error exists or not; and
(e) repeating said steps (a) to (d) either until uncorrectable errors are no longer detected at said step (g) or until the repetition number of the processings of said steps (a) to (d) becomes larger than a predetermined second limit number larger than said first limit number.

* * * * *